April 27, 1926.　　　　　　　　　　　　　　　1,582,520
L. D. KAY
DUAL TIRED TRUCK WHEEL
Filed March 5, 1925

INVENTOR,
Lloyd D. Kay;
By Lyon & Lyon
ATTORNEYS.

Patented Apr. 27, 1926.

1,582,570

UNITED STATES PATENT OFFICE.

LLOYD D. KAY, OF LOS ANGELES, CALIFORNIA.

DUAL-TIRED TRUCK WHEEL.

Application filed March 5, 1925. Serial No. 13,109.

*To all whom it may concern:*

Be it known that I, LLOYD D. KAY, a citizen of the United States, residing at Los Angeles, in the county of Los Angeles and State of California, have invented a new and useful Dual-Tired Truck Wheel, of which the following is a specification.

This invention relates to a truck wheel, and particularly concerns means for securing the tire on the wheel. While features of the invention may be employed in the construction of automobile wheels of any type, the invention is particularly applicable to a dual tired truck wheel of the type disclosed in my copending application Serial No. 675,597, dual tired truck wheel, filed November 13, 1923.

The general object of the invention is to provide improved means for securing a tire rim to a truck wheel; also to provide a dual tired truck wheel of simple construction in which the two tires may be very readily placed in position on the wheel from the outer side and while the wheel is on the truck. The invention includes a key-ring for securing the rim of the outboard tire near its inner edge, and one of the objects of the invention is to provide an improved construction for this ring to facilitate securing the outboard tire rim in position, the ring being constructed in such a way that it does not interfere in any way with the passing of the inboard tire rim over it when the inboard tire rim is being placed on the wheel.

Further objects of the invention will appear hereinafter.

The invention consists in the novel parts and combination of parts to be described hereinafter, all of which contribute to produce an efficient dual tired truck wheel.

A preferred embodiment of the invention is described in the following specification, while the broad scope of the invention is pointed out in the appended claims.

Figure 3:
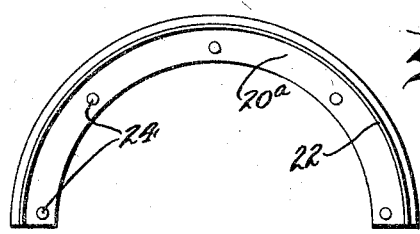
Fig. 3 is a side elevation showing the inner face of the inboard key ring for the outboard tire and further illustrating details of its construction.
Figure 1:
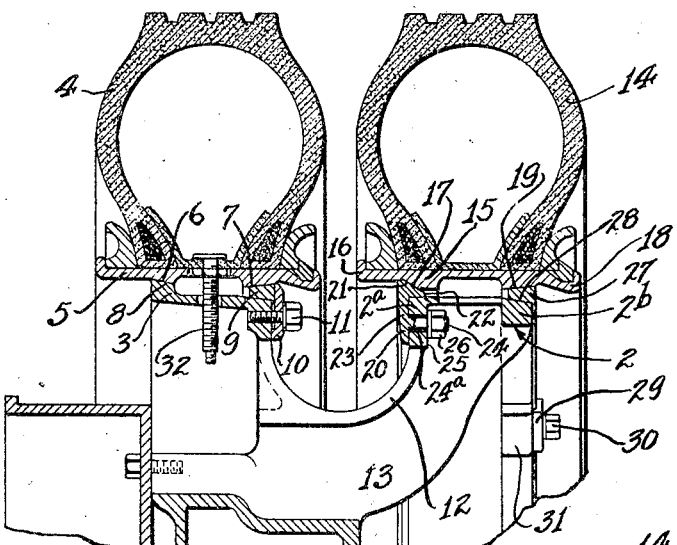
Fig. 1 is a vertical section taken through a dual tired truck wheel embodying my invention, the lower portion of the wheel being broken away.

In practicing my invention, the body 1 of the truck wheel is constructed in substantially the same way as the truck wheel illustrated in my prior application referred to above. This wheel is preferably a cast steel wheel, and is formed with an outer or outboard felloe 2 and an inner or inboard felloe 3. The inboard tire 4 is carried on a rim 5 which is formed on its inner side with two inclined faces 6 and 7 which operate as seats for the rim. The inclined face 6 is received upon an inclined face 8 formed on an integral part of the inner felloe 3, and the other seat 7 is engaged by a tapered key ring 9 held in place by lugs 10 and bolts 11. The felloes 2 and 3 are distinct from each other, but are connected rigidly together by a web 12 which extends continuously around the wheel and which is preferably of arch form with the convex side disposed inwardly and the concave side outwardly. The web and the felloes are supported and connected integrally with radial spokes 13 which are integral with the hub portion of the body 1 of the wheel. The concave form of the web gives it increased strength with lightness.

The felloe 2 is formed of two rings indicated specifically by the numerals $2^a$ and $2^b$, the former of which constitutes the inboard ring and the latter of which constitutes the outboard ring, and these rings are connected integrally by the spokes. The outboard tire 14 is carried on the tire rim 15 which is substantially similar in construction to the inboard tire rim 5. This is provided on its inner face and toward its inner edge 16 with an inclined face 17 which constitutes an inboard seat, and near the outer edge 18 it is provided with an inclined face 19 which constitutes an outboard seat.

In order to secure the tapered rim 15 in position on the wheel I provide an inboard key-ring 20 of improved construction. This key-ring seats on the felloe and has an inclined face 21 to receive the seat 17, said face 21 being formed on a flange 22 which projects laterally from an annular body 23 of this ring. The shoulder of this flange seats on the outer face of the inner ring 2ᵃ of the felloe. The body of this key-ring 20 carries permanently attached bolts, that is to say, it is provided with a plurality of laterally projecting bolts 24 which are in the form of studs; the key-ring 20 is preferably a cast steel ring, and these studs are cast integral with it. When the key-ring is in place they project in an outward direction, that is to say, they project from the body in the same direction as the flange 22. These studs pass through stud openings 24ᵃ formed in lugs 25 on the inboard ring 2ᵃ and these openings are sufficiently large to provide clearance in a radial direction for the studs to insure that the flange 22 will receive all of the radial thrust from the ground which is exerted upon the tire. Hence, when the nuts 26 of these studs are tightened up, the studs are subjected merely to tension.

Near its outer edge 18 the rim 15 is secured by means of a tapered key-ring 27, the outer face of which engages the outboard seat 19 of the rim 15 and the inner face of which seats against the outer face 28 of the outboard ring of the felloe.

In placing the tires on the wheel, the key rings 20 and 27 are removed and the rim 5 with the inboard tire is passed over the outboard felloe and secured in position.

The inboard ring 20 is preferably formed in two sections 20ᵃ, each section constituting half of the key-ring. These two key-ring sections are then placed in position. In doing this, by reason of the fact that the studs 24 are integral with the key-ring sections, each section may be held properly aligned with each stud opposite to its corresponding opening 24ᵃ. The key-ring section is then shifted in an outboard direction so that the studs pass into their corresponding openings and the nuts 26 are then tightened up so as to secure the key-ring sections in place.

The outer tire rim 15 is then slid over the felloe until the seat 17 comes upon the inclined face 21 of the inboard key-ring 20, and the outboard key-ring 27 is then put in place and secured by means of lugs 29 and bolts 30 similar to the lugs 10 and 11, said bolts being threaded into bosses or lugs 31 formed integral with the outboard felloe ring 2ᵇ.

The bolts 11 and the studs 24 are arranged in a staggered relation with respect to each other and the studs 24 are sufficiently removed from the spokes 13 to enable them to be readily operated by a wrench applied from the outside. The fact that the nuts 26 can be put in place and secured from the outside greatly facilitates the securing of the outboard rim 15 in place.

Figure 2:
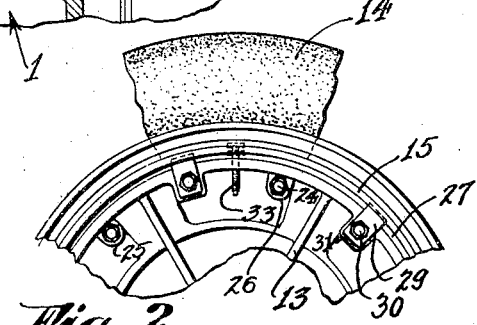
Fig. 2 is a side elevation of a portion of the wheel and a portion of a tire mounted thereon.

Both the rims are provided with inflating nipples 32 and 33. These inflating nipples are placed so that they can be conveniently reached in attaching the air hose. The inflating nipple 33 of the outer rim 15 is preferably placed midway between the lugs 25 and the lugs 31 (see Fig. 2).

Figure 5:
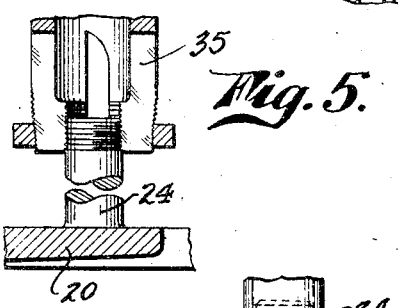
Fig. 5 is a section similar to Fig. 4, broken away, taken through the key ring and illustrating another step of the operation of constructing this ring.
Figure 4:
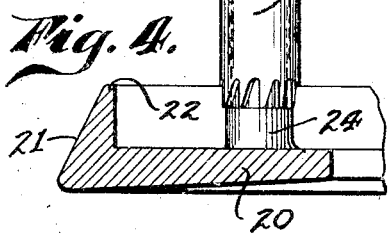
Fig. 4 is a section taken through the edge of the inboard key ring of the outboard tire, broken away, and illustrating one of the operations in producing the completed key ring.

According to my improved method of constructing the key-ring 20, I support the key-ring in a horizontal position (see Fig. 4) and then I apply an inside milling cutter 34 shown in Fig. 4 in operation. This cutter cuts the stud down to a blank of predetermined diameter, and the blank is then threaded by means of a threading tool 35 (see Fig. 5).

The concave shape of the web on its outer side results in producing a continuous channel around the wheel between the two felloes and this facilitates placing the sections of the key-ring in position.

It is understood that the embodiment of the invention described herein is only one of the many embodiments this invention may take, and I do not wish to be limited in the practice of the invention, nor in the claims, to the particular embodiment set forth.

What I claim is:

1. A truck-wheel having a felloe in combination with a rim to carry the tire and having a seat on its inner face disposed toward the inner edge of the rim, a key-ring seating on the felloe and having a face to receive the said seat, and bolts permanently carried by the key-ring extending from the same toward the plane of the outer edge of the rim for securing the key-ring in place on the wheel.

2. A truck-wheel having a felloe in combination with a rim to carry the tire and having an inboard seat on its inner face disposed toward the inner edge of the rim, and an outboard seat on its inner face disposed toward the outer edge of the rim, a key-ring seating on the felloe adjacent the inner edge of the rim and having a face to receive its adjacent seat, stud bolts carried by the key-ring extending from the same toward the plane of the outer edge of the rim, and a second key-ring secured to the felloe and having a face to receive the outboard of the rim.

3. In a dual tired truck-wheel the combination of a wheel having an outboard felloe to carry an outboard tire and an inboard felloe to carry an inboard tire, with a web connecting the felloes, said web being disposed in an arch concave on its outer side and convex on its inner side, a tire-rim carried on the outboard felloe, having a seat on its inner side and disposed toward the inner edge of the rim, a key-ring carried by the outboard felloe and having a face receiving the said seat, said key-ring having bolts extending therefrom toward the plane of the outer edge of the rim for securing the key-ring to the wheel, and means secured to the outer felloe for securing the said rim near its outer edge.

4. A dual tired truck-wheel having spokes and an outboard felloe to carry an outboard tire, said felloe comprising an outboard ring and an inboard ring connected with the spokes of the wheel, a tire rim received over the felloe and having an inboard seat and an outboard seat on its inner face, a key-ring carried on said inboard ring engaging one of said seats and having bolts extending through the inboard ring and projecting toward the plane of the outboard ring for securing the key-ring in place on the wheel, and an outboard key-ring carried by the outboard ring and engaging the outboard seat of the tire rim.

5. A truck-wheel having a felloe in combination with a rim to carry the tire and having an inboard seat on its inner face disposed toward the inner edge of the rim, and an outboard seat on its inner face disposed toward the outer edge of the rim, a key-ring formed in sections seating on the felloe adjacent the inner edge of the rim and having a face to receive its adjacent seat, bolts carried by the key-ring extending from the same toward the plane of the outer edge of the rim, and a second key-ring secured to the felloe and having a face to receive the outboard seat of the rim.

6. As a new article of manufacture, a key-ring for holding a tire rim on a truck-wheel, consisting of an annular body with a laterally projecting flange to engage the felloe of a wheel, said body having integral studs projecting laterally therefrom in the same direction as the flange, said studs carrying nuts for securing the key-ring to the wheel.

7. In a dual tired truck-wheel the combination of a wheel having an outboard felloe to carry an outboard tire and an inboard felloe to carry an inboard tire, with a web connecting the felloes, said web being disposed in an arch concave on its outer side and convex on its inner side, a tire-rim carried on the outboard felloe, having a seat on its inner side and disposed toward the inner edge of the rim, a key-ring carried by the outboard felloe and having a face receiving the said seat, said key-ring having bolts extending therefrom toward the plane of the outboard edge of the rim for securing the key-ring to the wheel, and means secured to the outboard felloe for securing the said rim near its outboard edge, the concave form of said web forming a channel extending around the wheel, facilitating the placing of the key-ring in position.

Signed at Los Angeles, California, this 25th day of February 1925.

LLOYD D. KAY.